United States Patent
Sugiyama (10) Patent No.: US 9,011,053 B2
(45) Date of Patent: Apr. 21, 2015

(54) RAM GUIDING APPARATUS OF MACHINE TOOL

(76) Inventor: Akira Sugiyama, Rancho Palos Verdes, CA (US)

( * ) Notice: Subject to any disclaimer, the term of this patent is extended or adjusted under 35 U.S.C. 154(b) by 700 days.

(21) Appl. No.: 13/138,688

(22) PCT Filed: Aug. 3, 2010

(86) PCT No.: PCT/JP2010/063058
§ 371 (c)(1),
(2), (4) Date: Sep. 16, 2011

(87) PCT Pub. No.: WO2011/016438
PCT Pub. Date: Feb. 10, 2011

(65) Prior Publication Data
US 2012/0039683 A1 Feb. 16, 2012

(30) Foreign Application Priority Data

Aug. 4, 2009 (JP) .................. 2009-181480

(51) Int. Cl.
*B23Q 1/01* (2006.01)
(52) U.S. Cl.
CPC ....... *B23Q 1/012* (2013.01); *Y10T 409/307728* (2015.01); *B23Q 1/017* (2013.01)
(58) Field of Classification Search
CPC .......... B23C 1/002; B23C 1/06; B23Q 1/017; B23Q 1/01
USPC ................. 409/185, 190, 191, 202, 201, 235
See application file for complete search history.

(56) References Cited

U.S. PATENT DOCUMENTS

| | | | | |
|---|---|---|---|---|
| 5,161,926 A | * | 11/1992 | Schulz | 409/235 |
| 5,230,594 A | * | 7/1993 | Pilkington | 409/197 |
| 6,161,995 A | * | 12/2000 | Wakazono et al. | 409/191 |
| 7,357,769 B2 | * | 4/2008 | Takayama et al. | 483/41 |
| 7,566,193 B2 | * | 7/2009 | Haj-Fraj et al. | 409/216 |

FOREIGN PATENT DOCUMENTS

EP 1174990 A2 * 1/2002

OTHER PUBLICATIONS

English Translation of EP 1174990.*

* cited by examiner

*Primary Examiner* — Sunil K Singh
*Assistant Examiner* — Alan Snyder
(74) *Attorney, Agent, or Firm* — Flynn, Thiel, Boutell & Tanis, P.C.

(57) ABSTRACT

A ram guiding apparatus 1 of a machine tool is incorporated in a portal type machine tool 2 and provided with a cross saddle 5 that is cross-like in shape, as seen in a side view of the machine tool 2, provided so as to be freely movable in the horizontal direction along a horizontal cross beam 4. The cross saddle 5 has a box 18, both upper and lower faces thereof being open, in a front side of a horizontal part, wherein a first linear guide 21, a second linear guide 22, and a third linear guide 23, respectively serving as linear guides in the box 18 for a ram vertical movement, guide the ram 9 so as to be freely movable only in the vertical direction.

5 Claims, 5 Drawing Sheets

RAM GUIDING APPARATUS OF MACHINE TOOL

FIELD OF THE INVENTION

The present invention relates to an apparatus for guiding a ram in the vertical direction by use of a saddle, in a portal type machine tool, the ram being for use in holding a tool.

BACKGROUND OF THE INVENTION

A portal type machine tool is shown in Patent Document 1, and Patent Document 2, respectively. With the portal type machine tool, for example, a portal type machining center, a portal frame is made up by spanning a horizontal cross beam between respective columns provided on the right side and the left side, and the cross beam holds a saddle so as to be freely movable in the longitudinal direction thereof. The saddle is attached to the front face of the cross beam to be movably held by the cross beam as a front-face attached-type saddle, or attached to the upper face of the cross beam to be movably held by the cross beam as an upper-face attached-type saddle.

The front-face attached-type saddle, or the upper-face attached-type saddle is supported at a position on the front side of a machining center of the portal type, with a ram kept in a state reciprocatively movable in the vertical direction, the saddle holding, for example, a working head capable of controlling 5-axes, and an angle-type working head capable of controlling 5-axes at the lower end of the ram. A tool necessary for processing is fitted onto the end of a spindle of the working head capable of controlling 5-axes, thereby enabling the tool to apply a predetermined cutting operation to a workpiece from directions as required.

When the spindle and the tool are brought closer to a machine table upon a cutting operation being applied to the workpiece, the tip of the spindle moves away from support positions such as the ram, the saddle, and the cross beam, and so forth, thereby causing an increase in overhang amount. As a result, the ram, and the tool are susceptible to undergo vibration, and chattering at the time of processing the workpiece, at the time of heavy cutting in particular, so that a cut surface will become rough and the service life of a cutting tool will be significantly reduced, eventually leading to the breakage of the tool.

Further, with a portal type planer of a common structure, because the up-down movement of a movable cross beam is added to the movement of a ram, in the vertical direction, it will be possible to carry out processing of a workpiece large in height. On the other hand, however, the number of movable parts will increase, so that an actual capacity for heavy cutting, and processing accuracy will undergo deterioration as compared with the case of a fixed type cross beam.

PRIOR ART LITERATURE

Patent Document

Patent Document 1: JP 2005-22034 A
Patent Document 2: JP 2009-90439 A

SUMMARY OF THE INVENTION

Problems to be Solved by the Invention

It is therefore an object of the invention to improve a support configuration enabling reciprocative movement of a ram by use of a saddle in a portal type machine tool in order to suppress vibration of the ram, and the chattering phenomenon of a cutting tool, thereby aiming at not only an improvement in heavy cutting and improvement of a finished surface, but also an extension in the service life of the cutting tool, and prevention of breakage of the cutting tool.

Means for Solving the Problems

To that end, the inventor of the present invention has developed a portal type machine tool wherein a saddle, cross-like in shape as seen in a side view, that is, a cross saddle, is adopted and linear guides unique in configuration, serving as a guiding means, are incorporated between the cross saddle and a ram, thereby enabling the ram to stably make reciprocative movement.

More specifically, the invention (1) configures a ram guiding apparatus of a machine tool, said ram guiding apparatus comprising a cross saddle that is cross-like in shape, as seen in a side view of a portal type machine tool, provided so as to be freely movable in the horizontal direction along a horizontal cross beam, a ram attached to the cross saddle in such a way as to be freely movable in the vertical direction, the ram being for use in attachment of a working head thereto, and a linear guide for use in guidance in the vertical direction, incorporated between the front face of a vertical part of the cross saddle, and the ram, wherein the ram is fitted so as to be freely movable only in the vertical direction by the agency of the linear guide.

The invention (2) configures the ram guiding apparatus of a machine tool, wherein the under face of a horizontal part of the cross saddle, on the rear side thereof, is preferably opposed to the upper face of the cross beam, and the rear face of the vertical part of the cross beam is preferably opposed to the front face of the ram, respectively, thereby enabling the cross saddle to be freely movable along the cross beam.

The invention (3) configures the ram guiding apparatus of a machine tool, preferably further comprising a box provided on the front side of the horizontal part of the cross saddle, the upper face as well as the lower face of the box being open, wherein the linear guide for use in guidance in the vertical direction is incorporated inside the box, and the ram is fitted in such a way as to be freely movable in the vertical direction.

The invention (4) configures the ram guiding apparatus of a machine tool, wherein a first linear guide and a second linear guide, in parallel with each other, serving as the linear guide for use in guidance in the vertical direction, are preferably incorporated between the front face of the vertical part of the cross beam and the rear face of the ram.

The invention (5) configures the ram guiding apparatus of a machine tool, wherein the first linear guide and the second linear guide are preferably incorporated such that the first linear guide is orientated in a direction opposite to a direction in which the second linear guide is orientated.

The invention (6) configures the ram guiding apparatus of a machine tool, wherein a third linear guide serving as the linear guide for use in guidance in the vertical direction is preferably assembled on the front face of the ram, and between inner-side faces of the box, on the front side thereof, inside the box.

The invention (7) configures the ram guiding apparatus of a machine tool, wherein a third linear guide serving as the linear guide for use in guidance in the vertical direction may be assembled between a side face of the ram, and the inner-side face of the box, on both sides thereof, inside the box.

The invention (8) configures the ram guiding apparatus of a machine tool, wherein the linear guide for use in guidance in the vertical direction is preferably comprised of a first linear guide, a second linear guide, and a third linear guide, the first linear guide may be incorporated between the front face of the vertical part of the cross beam, and the rear face of the ram, inside the box, and the second linear guide may be incorporated between respective side faces of the ram, and the inner-side face of the box, on both sides thereof, and the third linear guide may be incorporated between a front face of the ram, and an inner-side face of the box, on the front side thereof, inside the box, the first to third linear guides being assembled so as to be parallel with each other.

The invention (9) configures the ram guiding apparatus of a machine tool, wherein the linear guide for use in guidance in the vertical direction is preferably comprised of a first linear guide, a second linear guide, and a third linear guide, the first linear guide may be incorporated between the front face of the vertical part of the cross beam, and the rear face of the ram, inside the box, and the second linear guide, and the third linear guide may be incorporated between a side face of the ram, and an inner-side face of the box, on both sides thereof, inside the box, the first to third linear guides being assembled so as to be parallel with each other.

Effect of the Invention

With the ram guiding apparatus of a machine tool, according to the invention (1), the cross saddle cross-like in shape, as seen in the side view of the portal type machine tool, is adopted, and the ram is supported and guided by a large segment of the horizontal cross beam, ranging from an upper part to a lower part thereof, on the front face of the vertical part of the cross saddle, so that an amount of overhang of the ram can be suppressed to a small length as compared with the portal type machine tool according to the prior art. For this reason, in a portal type machining center, and so forth, vibration at the time of a cutting operation can be mitigated, and cutting capacity is enhanced. As a result, heavy cutting capacity can be enhanced, and a finished surface can be improved, leading to an extension in the service life of a cutting tool.

According to the invention (2), since the cross saddle is supported in such a way to be freely movable along the upper face and the front face of the cross beam, even if a force in a wobbling direction (in an x-axis direction, or a y-axis direction) acts on the ram, coupling parts between the cross saddle and the cross beam, being under large rigidity, can sufficiently cope with the force.

According to the invention (3), since the box on the front side of the horizontal part of the cross saddle is incorporated in such a way as to be freely movable in the vertical direction, a support structure suitable for guiding the ram only in the vertical direction can be established.

According to the invention (4), since the first linear guide and the second linear guide are fitted between the front face of the vertical part of the cross beam and the rear face of the ram, thereby supporting the ram cooperatively, the rear face of the ram is strongly supported under a high rigidity.

According to the invention (5), since the first linear guide and the second linear guide are preferably incorporated such that the first linear guide is orientated in a direction opposite to a direction in which the second linear guide is orientated, a rail of the first linear guide is fitted to the front face of the vertical part of the cross saddle and a rail of the second linear guide is fitted to the rear face of the ram, so that the ram is strongly supported by the linear guides, and the second linear guides from the direction of the front face, and the direction of the rear face, respectively, in a mutually complementary manner. In so doing, movement of the ram, in the vertical direction (in a z-axis direction), is stabilized even at the time of cutting.

According to the invention (6), since the third linear guide for use in guidance in the vertical direction is preferably assembled on the front face of the ram, and between inner-side faces of the box, on the front side thereof, movement of the ram, in the vertical direction, is rendered more reliable even at the time of cutting.

According to the invention (7), since the third linear guide may be assembled between respective side faces of the ram and the inner-side face of the box, on both sides thereof, the respective side faces of the ram are supported, so that a force acting on the ram, applied from a side thereof, can be sufficiently coped with, and therefore, stable and reliable support can be provided.

According to the invention (8), since the ram is supported by the first linear guide, the second linear guide and the third linear guide from all around, a force acting on the ram, applied from the four sides thereof, can be sufficiently coped with, and therefore, stable and reliable support can be provided.

According to the invention (9), since the second linear guide and the third linear guide may be incorporated between respective side faces of the ram, and an inner-side face of the box, on both sides thereof, a large force acting on the ram, applied from a side thereof, can be sufficiently coped with, and therefore, stable and reliable support can be provided.

BRIEF DESCRIPTION OF THE DRAWINGS

FIG. 4 In the ram guiding apparatus of a machine tool according to the invention, FIG. 4 (1) is a rear view of a ram, and FIG. 4 (2) is a front view of a vertical part of a cross saddle.

DETAILED DESCRIPTION OF THE PREFERRED EMBODIMENTS

FIG. 1 to FIG. 5 show a ram guiding apparatus 1 of a machine tool according to the invention. In these figures, the ram guiding apparatus 1 of a tool machine premises a portal type machine tool 2. The portal type machine tool 2 is, for example, a portal type machining center, wherein a portal part is made up by spanning a horizontal cross beam 4 between respective columns provided on the right side and the left side, so as to hold a cross saddle 5 by the columns 3 and the cross beam 4.

The cross saddle 5 cross-like in shape, as seen in a side view, is made up of a horizontal part 6 extended in a front-to-back direction, that is, in an x-axis direction, and a vertical part 7 extended in a direction crossing the horizontal part 6, that is, in a y-axis direction, the cross saddle 5 being provided so as to be freely movable in the horizontal direction along the cross beam 4, that is, in the y-axis direction, holding a ram 9 for supporting a working head 8 on the front side of the ram guiding apparatus 1 such that the ram 9 is freely movable in the vertical direction, that is, in a z-axis direction.

The cross saddle 5 is movably guided in the y-axis direction by, for example, two pieces of linear guides 10 on the upper face of the cross beam 4, and one piece of linear guide 10 on the front face thereof, that is, three pieces of the linear guides 10, in total. The linear guides 10 each are made up by combination of one length of rail 11, and two pieces of sliders 12, two lengths of the rails 11 are provided on the upper face of the cross beam 4, and one length of the rail 11 is provided on the front face thereof, that is, three lengths of the rails 11, in total, are provided, while the slider 12 is provided on the underside of the horizontal part 6, and on the rear face of the vertical part 7, respectively, two pieces of the slider 12, in pairs, being provided for each of the rails 11, at predetermined intervals in the longitudinal direction of the rail 11.

Instead of the rails 11 of the linear guides 10, according to the embodiment shown in the drawings by way of example, one length of the rail 11 may be provided on the upper face of the cross beam 4, and two lengths of the rails 11 may be provided on the front face thereof, that is, three lengths of the rails 11, in total, may be provided, or two lengths of the rails 11 can be provided on the front face as well as the upper face of the cross beam 4, as necessary. The cross saddle 5 is so configured as to be driven by a feed screw unit (not shown) parallel with the rail 11, and a motor of the feed screw unit, for turning a feed screw. Further, the feed screw is screwed into a screw nut parallel with the rail 11, and integral with the cross saddle 5, and the motor is generally attached to a part of the cross beam 4.

The working head 8 is attached to the lower end of the ram 9 through the intermediary of a bifurcated-type support arm 34, and a cutting operation is applied to workpiece 15 as a work target by use of a tool 14 fitted to the tip of, for example, a 5-axes controllable spindle 13. The workpiece 15 is fixed onto a worktable 16, and the worktable 16 is installed on a machine base 17 so as to be freely movable in the direction orthogonal to the y-axis direction, that is, in the x-axis direction, as necessary.

Further, a thickness (a dimension in the z-axis direction) of the cross beam 4 is equivalent to, or larger than a length (a dimension in the z-axis direction) of the working head 8, and the support arm 34, in the vertical direction. If such a dimensional relationship as described is maintained, when the working head 8 is at an ascent limit, the working head 8 and the support arm 34 can be positioned at the front of the cross beam 4, being in a state in which these parts hardly protrude from the lower end face of the cross beam 4, as noted in FIG. 1, and FIG. 2.

The ram guiding apparatus 1 of a machine tool, according to the invention, has a typical feature in configuration in that a first linear guide 21 and a second linear guide 22, serving as linear guides for guiding the ram in the vertical direction, are provided between the front face of the vertical part 7 of the cross saddle 5 and the rear face of the ram 9, and the ram 9 is provided so as to be freely movable only in the vertical direction (the z-axis direction) in relation to the cross saddle 5 by the agency of the first linear guide 21 and the second linear guide 22.

Two pieces of the first linear guides 21 in pairs are in use, and each of the first linear guides 21 is assembled by pairing one length of a rail 24 with two pieces of sliders 25, positioned above, and below, respectively. Further, two pieces of the second linear guides 22 in pairs are in use, and each of the second linear guides 22 is assembled by pairing one length of a rail 26 with two pieces of sliders 27, above and below, respectively.

Figure 3:
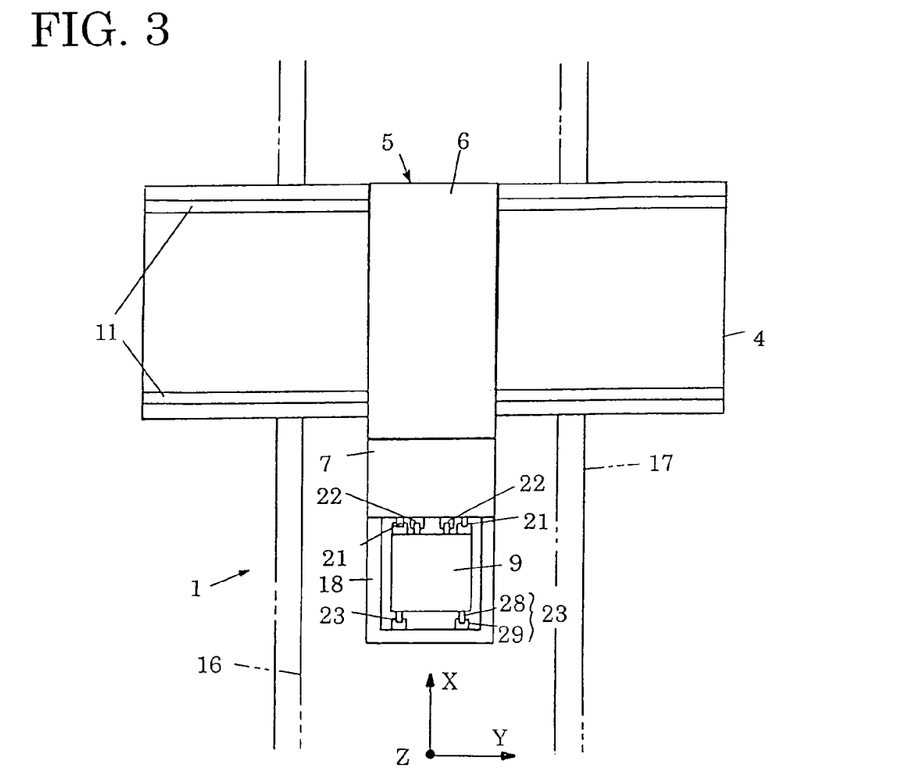
FIG. 3 A plan view of a principal part of the ram guiding apparatus of a machine tool according to the invention.
Figure 4:
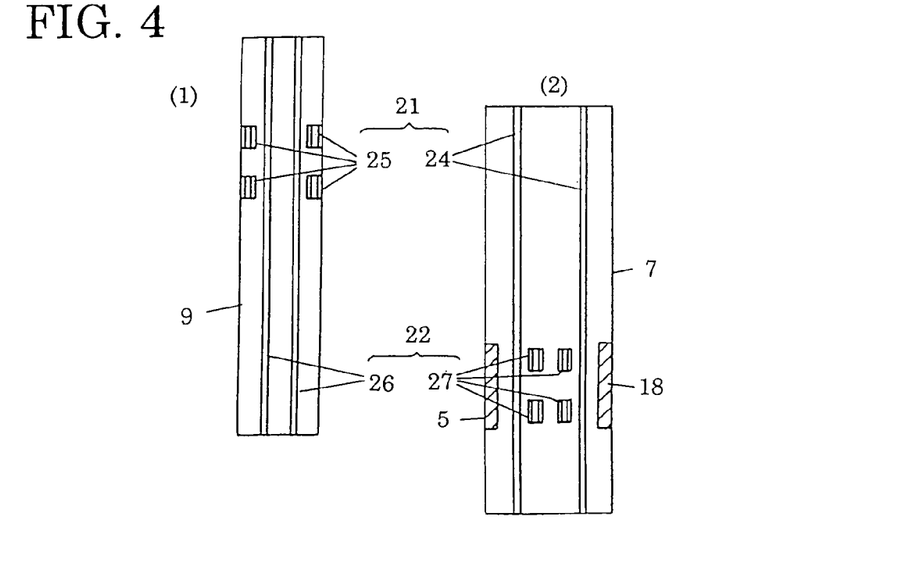

FIGS. 3 and 4 each show a state in which the first linear guides 21 and the second linear guides 22 are attached. Two lengths of the rails 24 of the first linear guides 21 are attached to the front face of the vertical part 7 of the cross saddle 5, in a state parallel therewith, across a length from the upper end of the vertical part 7 to the lower end thereof, while four pieces of the sliders 25 are attached to positions on an upper part of the rear face of the ram 9, corresponding to the two lengths of the rails 24, respectively, at predetermined intervals in the vertical direction.

Further, two lengths of the rails 26 of the second linear guides 22 are attached in a state parallel with each other between the right and left sliders 25 on the rear face of the ram 9, across a length from the upper end of the ram 9 in the shape of, for example, a square column to the lower end thereof, and four pieces of the sliders 27 are attached to positions on a slightly lower part on the front face of the vertical part 7, corresponding to the two lengths of the rails 26, respectively, at predetermined intervals in the vertical direction. Thus, the first linear guides 21 is orientated in a direction opposite to a direction in which the second linear guides 22 is orientated, so that the first linear guides 21 and the second linear guides 22 are incorporated with high precision.

Figure 8:
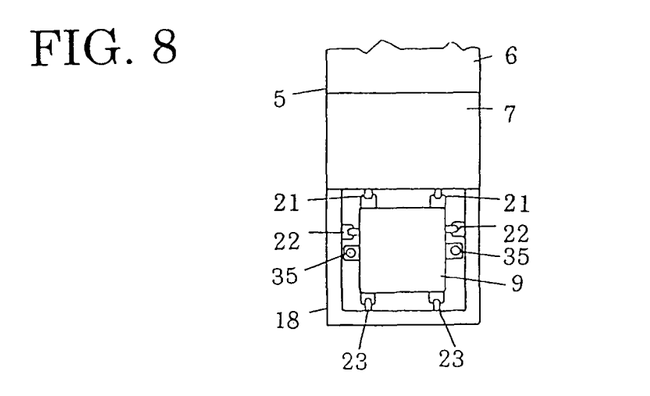
FIG. 8 A plan view of still another principal part of a ram guiding apparatus of a machine tool according to the invention.
Figure 9:
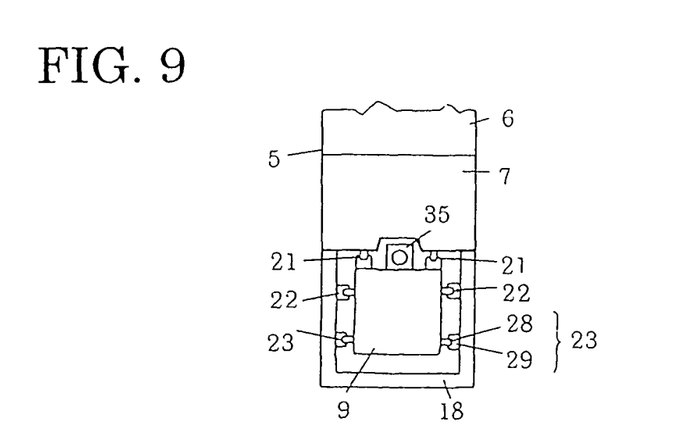
FIG. 9 A plan view of still another principal part of a ram guiding apparatus of a machine tool according to the invention.

As is the case with the cross saddle 5, the ram 9 is so configured as to be driven by feed screw units (not shown) parallel with the rails 24, 26, respectively, and a motor of the feed screw unit for turning a feed screw. Further, the feed screw is normally disposed between the rails 26, and is screwed into a screw nut integral with the ram 9, and the motor is attached to a part of the vertical part 7. Further, an example of the disposition of the feed screw units is shown in FIGS. 8 and 9, referred to later on.

A front side part of the horizontal part 6 of the cross saddle 5 makes up a box 18 square in shape, both upper and lower faces thereof being open, corresponding to the ram 9 in the shape of the square column, the ram 9 is in a state movable in the vertical direction within the box 18, and a third linear guide 23 is provided between the front face of the ram 9, and an inner-side face of the box 18, on the front side thereof, in order to guide the ram 9 in the vertical direction.

Figure 1:
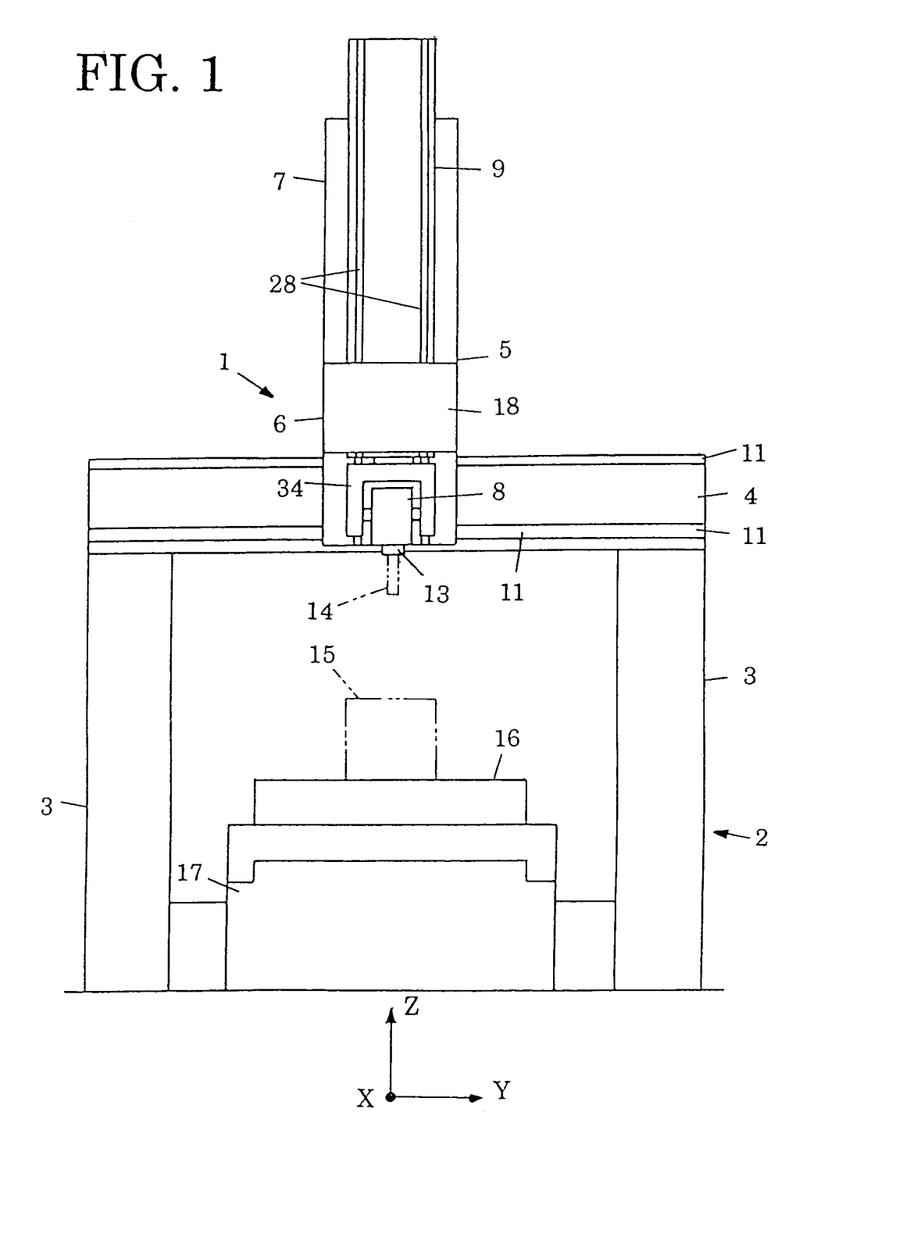
FIG. 1 A front view of a ram guiding apparatus of a machine tool according to the invention.
Figure 2:
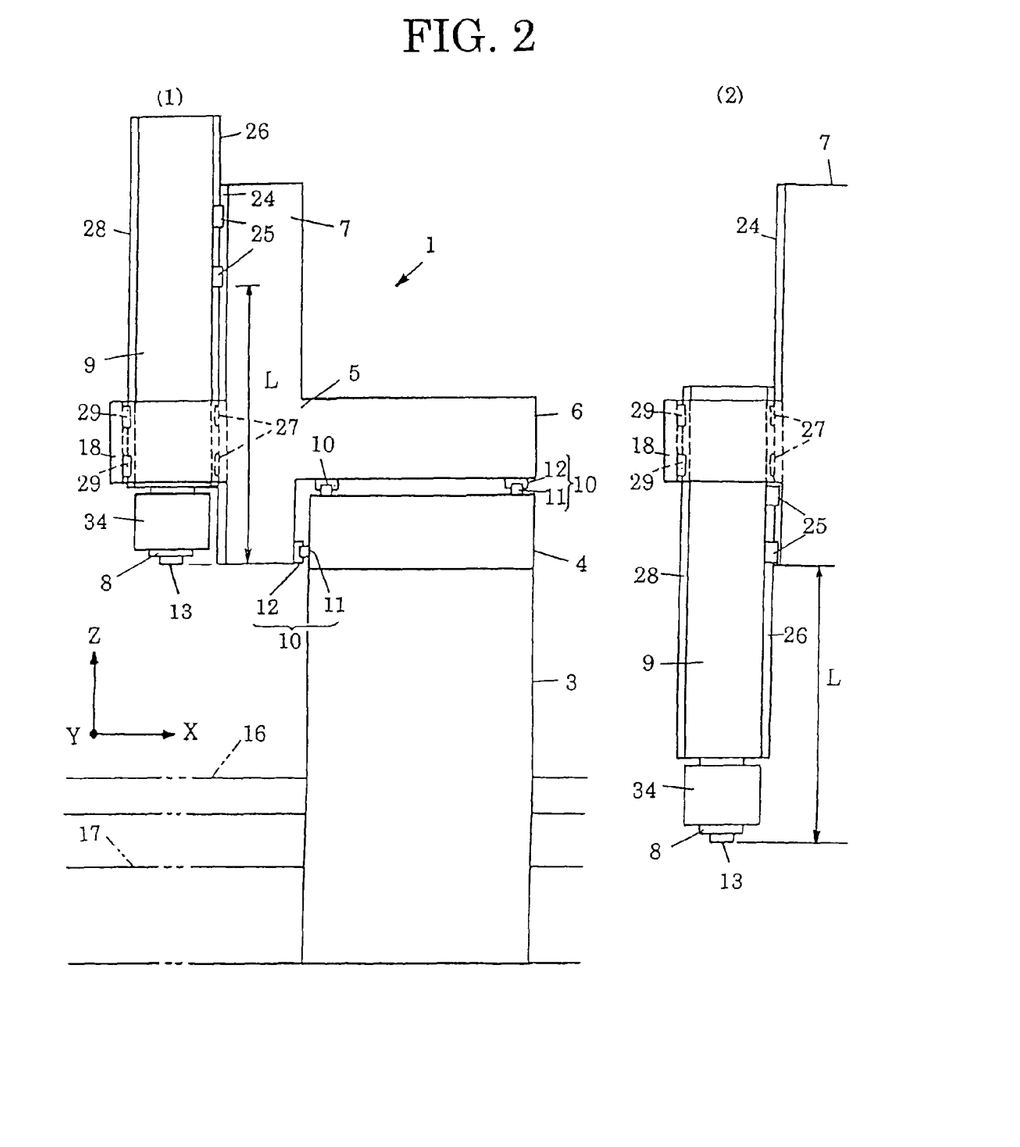
FIG. 2 A side view of a principal part of the ram guiding apparatus of a machine tool according to the invention, wherein FIG. 2 (1) shows an ascending state of the ram (original position of the z-axis), and FIG. 2 (2) shows a descending state of the ram (maximum descent position in the z-axis direction).

The third linear guide 23 is made up of two lengths of rails 28, and four pieces of sliders 29 as noted in FIG. 1 to FIG. 3, the two lengths of the rails 28 are provided on the front face of the ram 9 so as to range from the upper end to the lower end thereof at a predetermined interval, and the four pieces of the sliders 29 are attached to positions on the inner-side face of the box 18, on the front side thereof, corresponding to the two lengths of the rails 28, respectively, at predetermined intervals in the vertical direction.

Figure 5:
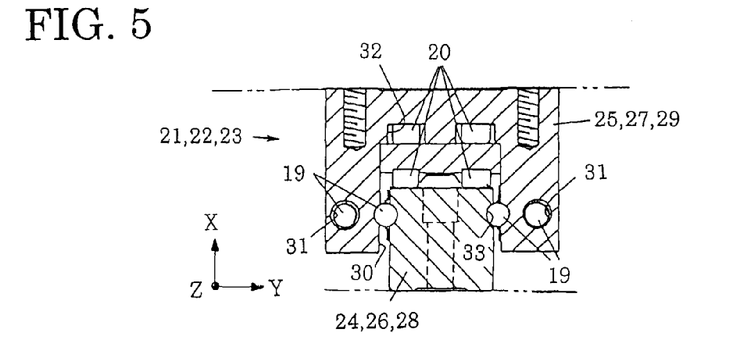
FIG. 5 A sectional view of a linear guide.

In FIG. 5, there are shown specific configurations of the first linear guide 21, the second linear guide 22 and the third linear guide 23, respectively, by way of example. The sliders 25, 27, 29 of those linear guide are of, for example, a rolling movement type, housing a plurality of balls 19 on the respective sides of a guide groove 30, and a plurality of rollers 20 on the bottom face of the guide groove 30, respectively. The plurality of the balls 19 and the rollers 20 are housed in a circulatory state along circulation paths 31, 32, respectively.

The ball 19 is abutted against a guide groove 33 on respective side faces of the rails 24, 26, 28, thereby preventing dislocation of the sliders 25, 27, 29 from the rails 24, 26, 28, respectively, into the x-axis direction, while preventing the same from wobbling in the y-axis direction. Further, the rollers 20 are in contact with the respective top faces of the rails 24, 26, 28 to be subjected to a load in the x-axis direction. Due to such a construction as described, the sliders 25, 27, 29 are in a state movable only in the longitudinal direction (the z-axis direction) of the rails 24, 26, 28, respectively.

Further, for the sliders 25, 27, 29, a surface-contact sliding movement type may be adopted instead of the rolling movement type, thereby establishing a configuration wherein the sliders 25, 27, 29 are movable only in the longitudinal direction (the z-axis direction) of the rails 24, 26, 28, respectively.

As described in the foregoing, the cross saddle 5 is driven by the feed screw units (not shown) movable in the y-axis direction, and the motor to be moved to a predetermined position. Further, the ram 9 is driven by the feed screw units (not shown) movable in the z-axis direction, and the motor to be moved to a predetermined position. At this point in time, the tool 14 fitted to the working head 8 applies a necessary cutting operation to the workpiece 15.

A cutting resistance force occurs to the tool 14 at the time of the cutting operation, and the force acts on coupling parts between the ram 9, and the cross saddle 5, more specifically, on the first linear guides 21, respective positions of the sliders 25, corresponding to the rail 24, in particular, the second linear guides 22, respective positions of the sliders 27, corresponding to the rail 26, in particular, and the third linear guide 23, respective positions of the sliders 29, corresponding to the rail 28, in particular, to be split among the first to third linear guides. Accordingly, the ram 9 is stably supported by the cross saddle 5, and will be in a state sufficiently capable of coping with the cutting resistance force even when an amount of downward overhang is large.

Particularly, because the first linear guides 21 and the second linear guides 22 are assembled between the ram 9 and the cross saddle 5 such that the first linear guides 21 are oriented in the direction opposite to the direction in which the second linear guides 22 are oriented, and the rails 24 and the rails 26 are attached to respective sides differing from each other, followed by attachment of the sliders 25 and the sliders 27 to respective sides differing from each other, a force is mutually complemented by the respective first linear guides 21 and the respective second linear guides 22, so that guidance with a high precision under excellent rigidity can be provided. Accordingly, the ram 9 and the cross saddle 5 pick up little vibration caused by cutting with the tool 14, even at the time of heavy cutting, hardly causing the chattering phenomenon and resonance.

Figure 6:
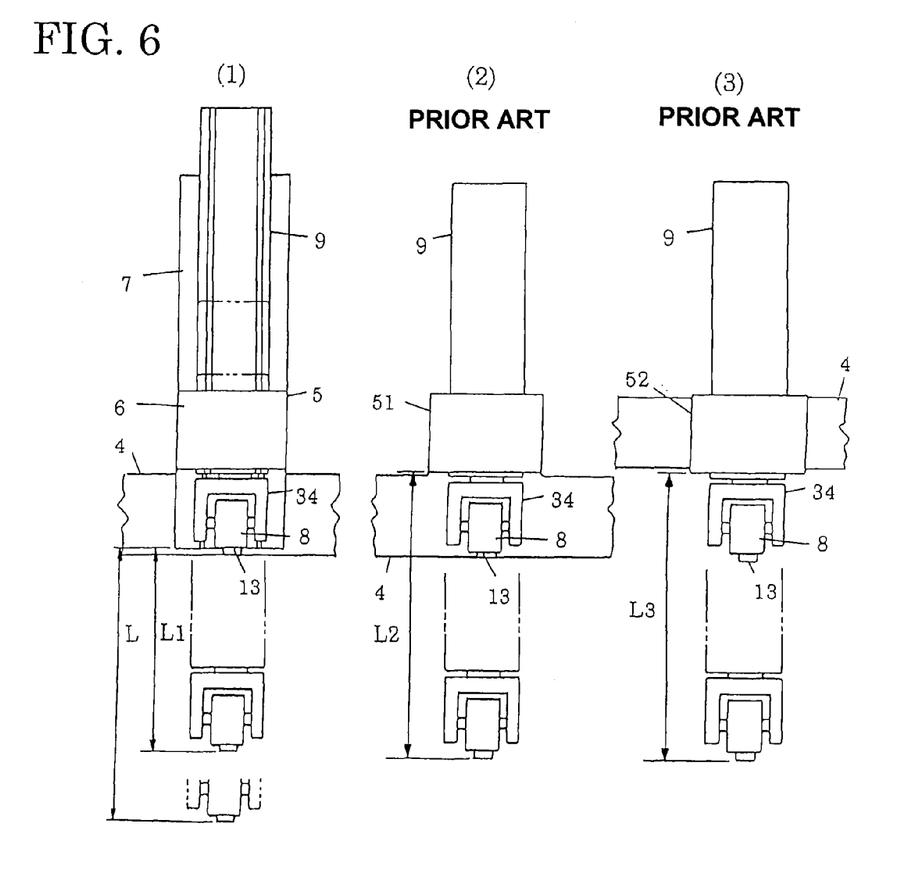
FIG. 6 A front view of a principal part of a ram guiding apparatus for comparison between the ram guiding apparatus of a machine tool according to the invention and the conventional ram guiding apparatus, wherein FIG. 6 (1) shows the ram guiding apparatus of the invention and FIG. 6 (2) shows a conventional saddle of an upper-face attached type, and FIG. 6 (3) shows a conventional saddle of a front-face attached type.

Now, FIG. 6 (1) to FIG. 6 (3) each are a front elevation showing the principal part of a ram guiding apparatus of a machine tool in connection with an explanation about an operation thereof, in which FIG. 6 (1) shows the operation of the ram guiding apparatus 1 of the machine tool, according to the invention, FIG. 6 (2) shows the operation of a conventional saddle 51 of an upper-face attached type, and FIG. 6 (3) shows the operation of a conventional saddle 52 of a front-face attached type. In FIG. 6 (2), and FIG. 6 (3), parts corresponding to those according to the invention are denoted by like reference numerals for the sake of convenience.

In FIG. 6 (1), FIG. 6 (2) and FIG. 6 (3), the spindle 13 of the working head 8 is at its ascent limit as an original position, being positioned at the same height. In FIG. 6 (1), and FIG. 6 (2), the cross beam 4 is positioned at the same height, however, in FIG. 6 (3), the saddle 52 is attached to the front face of the cross beam 4, and therefore, the cross beam 4 is provided at a position higher by one step.

When the spindle 13 is set at the original position (the ascent limit) indicated by a solid line, or a position in close proximity thereto, a portion of the ram 9, corresponding to a long segment of the vertical part 7 ranging from the upper end thereof to the lower end thereof, is supported by the first linear guide 21, the second linear guide 22, and so forth, as noted in FIG. 6 (1), so that the ram 9 is hardly subjected to vibration due to cutting, even at the time of heavy cutting, to be stably supported without undergoing resonance. Accordingly, when the spindle 13 is at the original position (the ascent limit), or at the position in close proximity thereto, the ram 9 can be supported by the sliders 25 of the first linear guides 21 and the sliders 27 of the second linear guides 22, with a long distance interjacent therebetween, so that the ram 9 is more firmly held, thereby playing a role of coping with heavy cutting.

In contrast, a portion of the ram 9, above the saddle 51, and the saddle 52, respectively, has no support, and only a portion of the ram 9, corresponding to a segment thereof, including the saddle 51, or the saddle 52, is supported, as seen in FIG. 6 (2), and FIG. 6 (3), respectively. For this reason, the ram 9, the saddle 51, or the saddle 52 become susceptible to pick up vibration due to cutting, leading to resonance, and are incapable of withstanding heavy cutting.

In FIG. 6 (1), FIG. 2) and FIG. 6 (3), assuming that the respective spindles 13 are moved to a working position at the same height indicated by an alternate long and two short dashes line, respective overhang amounts (protrusion amounts) of the spindles 13 correspond to respective positions where support by the cross saddle 5, the saddle 51, and the saddle 52, respectively, are lost, that is, a length L1 from a position at the lower end of the vertical part 7 to the tip of the spindle 13, in FIG. 6 (1), and lengths L2, L3, from respective positions at the lower ends of the saddle 51, and the saddle 52, respectively, to the tip of the spindle 13, in FIGS. 6 (2), and 6 (3), respectively.

According to a construction shown in FIG. 6 (1), the maximum overhang amount is equal to a length L from the lower end of the lower slider 25 of the sliders 25, positioned above, and below, respectively, to the lower end of the rail 24 at an original position (an ascent limit) of the ram 9 as shown in FIG. 2. The length L at that point in time is substantially equal to the maximum descent amount of the ram 9, in the z-axis direction. Further, when the lower slider 25 moved down to the lower end of the rail 24, an upper part of the ram 9 will be in a state in which it is prevented from coming out from inside the box 18 in order to provide stable guidance • support.

Herein, as for a relationship in magnitude of the overhang amount, the length L1<the length L2, or L3. As a result, with the ram guiding apparatus 1 of a machine tool, according to the invention, the overhang amount is rendered smaller even in the case of movement over an identical distance between respective positions. Accordingly, when a large cutting resistance force acts on the tool 14 attached to the tip of the spindle 13 upon application of a cutting operation, moment at that point in time can be suppressed to a smaller value as compared with the case of the ram guiding apparatus of the conventional type because of a smaller overhang amount. The ram guiding apparatus 1 of a machine tool, according to the invention, is therefore advantageous in that the ram 9 picks up less vibration caused by cutting with the tool 14 at the time of heavy cutting, thereby hardly causing chattering phenomenon and resonance. The length L1 is generally in a range of around 600 to 800 mm.

In the case where a high-output spindle motor is attached to the working head 8, in particular, the motor becomes larger in length, thereby causing the total length of the working head 8 as well to be greater. Thus, if the high-output spindle motor is attached, this will cause an increase in overhang amount, thereby causing a problem in that because momentum of the ram 9 will increase at the time of cutting, it will become impossible to execute heavy cutting although the high-output spindle motor is attached. As a result, nothing but light cutting can be carried out. For this reason, it is useful from a standpoint of a practical cutting operation to be able to suppress the overhang amount to a small length.

Further, the overhang amounts of the spindles 13, shown in FIG. 6 (2), and FIG. 6 (3), respectively, are equal to each other, however, in FIG. 6 (1), and FIG. 6 (2), the respective columns 3 on the right side and the left side become smaller in length to an extent that the cross beam 4 is at a lower position, so that the strength of the columns 3, shown FIG. 6 (1), and FIG. 6 (2), respectively, is secured with greater ease as compared with the case of the columns 3, shown FIG. 6 (3).

Figure 7:
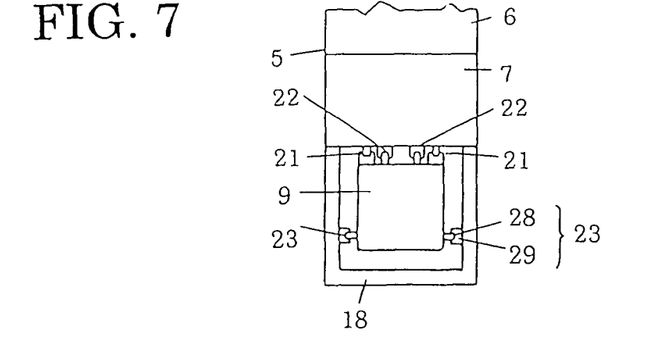
FIG. 7 A plan view of another principal part of a ram guiding apparatus of a machine tool according to the invention.

Next, in FIG. 7, there is shown the principal part of the ram guiding apparatus 1 according to another embodiment of the invention, wherein the third linear guide 23 for guiding the ram 9 in a vertical direction is incorporated between respective side faces of the ram 9 and an inner face of the box 18, on both sides thereof, in the configuration shown in FIG. 3, and the ram 9 is fitted in such a way as to be freely movable only in the vertical direction by the agency of the three types of the linear guides, that is, the linear guide 21, the second linear guide 22, and the third linear guide 23. With this embodiment, since the ram 9 is guided along the front side thereof, movement in the y-axis direction can be controlled with greater reliability.

In FIG. 8, there is shown the principal part of the ram guiding apparatus 1 according to still another embodiment of the invention, wherein the second linear guide 22 is incorporated between respective side faces of the ram 9 and an inner face of the box 18, on both sides thereof, in the configuration shown in FIG. 3, and the ram 9 is fitted in such a way as to be freely movable only in the vertical direction by the agency of the three types of the linear guides, that is, the linear guide 21, the second linear guide 22 and the third linear guide 23. With this embodiment, since the ram 9 is guided along all four side faces thereof, movement in the y-axis direction can be controlled with greater reliability. According to the configuration shown in FIG. 3, the first linear guides 21 are opposed in orientation to the second linear guides 22, so that if those linear guides are assembled in a state having no play, movement of the ram 9 in the vertical direction will be susceptible to having a problem, however, with a configuration shown in FIG. 8, such an inconvenience can be mostly avoided.

In FIG. 9, there is shown the principal part of the ram guiding apparatus 1 according to still another embodiment of the invention, wherein the third linear guide 23 is incorporated between respective side faces of the ram 9, and the inner face of the box 18, on both sides thereof, in the configuration shown in FIG. 8, and the ram 9 is fitted in such a way as to be freely movable only in the vertical direction by the agency of the three types of linear guides, that is, the linear guide 21, the second linear guide 22, and the third linear guide 23.

Further, a feed screw unit 35 for use in the up/down movement of the ram 9, is disposed in space along respective side faces of the ram 9, inside the box 18, two units of the feed screw unit 35, in total, being disposed as shown in FIG. 8, or the feed screw unit 35 as one unit is disposed in space on the rear face side of the ram 9, inside the box 18, as shown in FIG. 9. With the embodiments shown in FIG. 3, and FIG. 7, respectively, either the feed screw units 35 as two units, or the feed screw unit 35 as one unit, are incorporated in the box 18 in such a manner as shown in either FIG. 8 or FIG. 9. Use of the two units of the feed screw units 35 is quite advantageous in terms of rigidity and speed as compared with the general case of using the one unit of the feed screw unit 35.

INDUSTRIAL APPLICABILITY

Although the ram guiding apparatus of a machine tool of the invention is utilized for the portal type machine tool 2, the portal type machine tool is applied not only to a machining center but also to a processing machine such as a drilling machine, a planing machine, a milling machine, and so forth.

EXPLANATION OF NUMERALS

1 Ram guiding apparatus of a machine tool
2 Portal type machine tool
3 Column
4 Cross beam
5 Cross saddle
6 Horizontal part
7 Vertical part
8 Working head
9 Ram
10 Linear guide
11 Rail
12 Slider
13 Spindle
14 Tool
15 Workpiece
16 Worktable
17 Machine base
18 Box
19 Ball
20 Roller
21 First linear guide
22 Second linear guide
23 Third linear guide
24 Rail
Slider
26 Rail
27 Slider
28 Rail
29 Slider
30 Guide groove
31 Circulation path
32 Circulation path
33 Guide groove
34 Support arm
35 Feed screw unit
51 Conventional upper-face attached type saddle
52 Conventional front-face attached type saddle

The invention claimed is:

1. A ram guiding apparatus of a machine tool, the ram guiding apparatus comprising a saddle having a cross shape, as seen in a side view of a portal machine tool, provided to be freely movable in the horizontal direction along a cross beam, while the under face of a horizontal part of the cross-shaped saddle, on the rear side thereof, is opposed to the upper face of the cross beam, and the rear face of the vertical part of the cross-shaped saddle is opposed to the front face of the cross beam, respectively, a box provided on the front side of the horizontal part of the cross-shaped saddle, upper and lower faces of the box being open, a ram for fitting a working head thereto housed inside the box, a linear guide elongated in a vertical direction and incorporated between the front face of the vertical part of the cross saddle above and under the vertical part and the rear face of the ram for use in guidance in the vertical direction, said linear guide including a first linear guide and a second linear guide, arranged in parallel with each other at different horizontal positions, so as not to interfere with each other, when the ram moves in the vertical direction, wherein the ram is fitted by the first linear guide and the second linear guide while the first linear guide and the second linear guide are oriented in opposite directions so that the ram is freely movable by the first and second linear guides only in the vertical direction.

2. The ram guiding apparatus of a machine tool according to claim 1, wherein the linear guide for use in guidance in the vertical direction is comprised of a first linear guide, a second linear guide, and a third linear guide, the first linear guide is incorporated between the front face of the vertical part of the cross beam, and the rear face of the ram, inside the box, and the second linear guide is incorporated between respective side faces of the ram, and the inner-side face of the box, on both sides thereof, inside the box, and the third linear guide is incorporated between a front face of the ram, and an inner-side face of the box, on the front side thereof, inside the box, the first to third linear guide being assembled so as to be parallel with each other.

3. The ram guiding apparatus of a machine tool according to claim 1, wherein the linear guide for use in guidance in the vertical direction is comprised of a first linear guide, a second linear guide, and a third linear guide, the first linear guide is incorporated between the front face of the vertical part of the cross beam, and the rear face of the ram, inside the box, and the second linear guide, and the third linear guide is incorporated between a side face of the ram, and an inner-side face of the box, on both sides thereof, inside the box, the first to third linear guide being assembled so as to be parallel with each other.

4. The ram guiding apparatus of a machine tool according to claim 1, wherein the linear guide for use in guidance in the vertical direction further includes a third linear guide that is incorporated between a front face of the ram and an inner-side face of the box at the front side, inside the box.

5. The ram guiding apparatus of a machine tool according to claim 1, wherein the linear guide for use in guidance in the vertical direction still further includes a third linear guide that is assembled between both side faces of the ram and inner side faces of the box, inside the box.

* * * * *